D. H. BISHARD.
MOTOR BLOCK HANDLING DEVICE.
APPLICATION FILED APR. 1, 1920.

1,365,220.

Patented Jan. 11, 1921.
4 SHEETS—SHEET 2.

Inventor
Dudley H. Bishard
By Thomas R. Harne
Attorney

D. H. BISHARD.
MOTOR BLOCK HANDLING DEVICE.
APPLICATION FILED APR. 1, 1920.
1,365,220.
Patented Jan. 11, 1921.
4 SHEETS—SHEET 3.
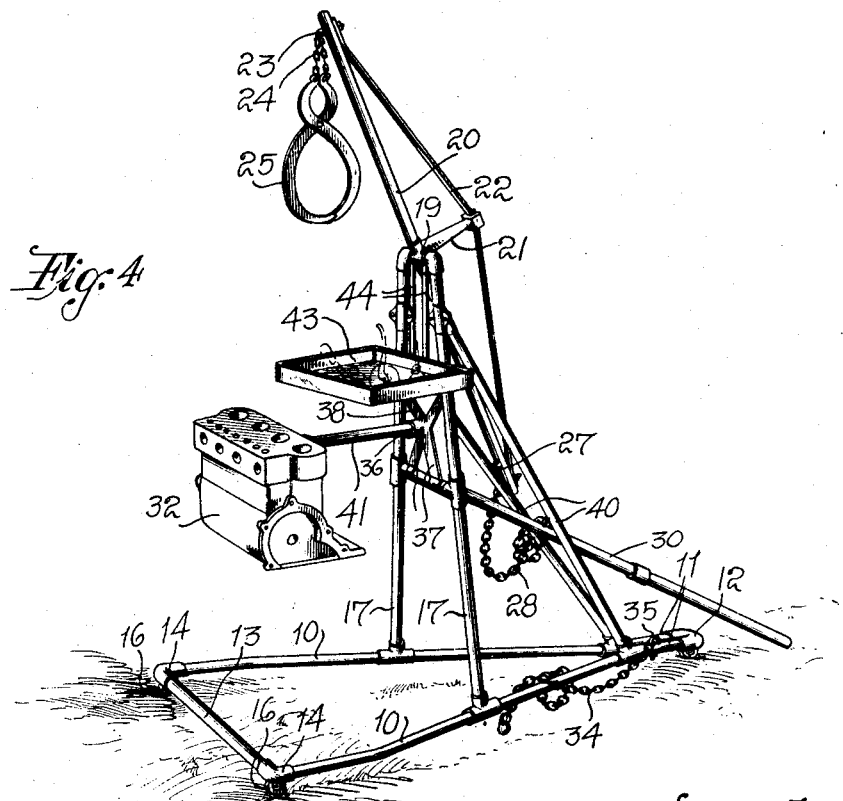
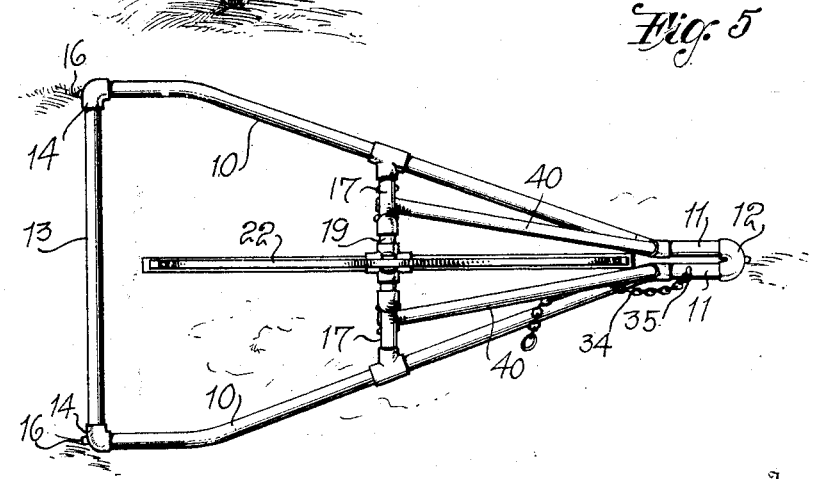
Inventor
Dudley H. Bishard
By Thomas R. Harvey
Attorney D. H. BISHARD.
MOTOR BLOCK HANDLING DEVICE.
APPLICATION FILED APR. 1, 1920.
1,365,220.
Patented Jan. 11, 1921.
4 SHEETS—SHEET 4.
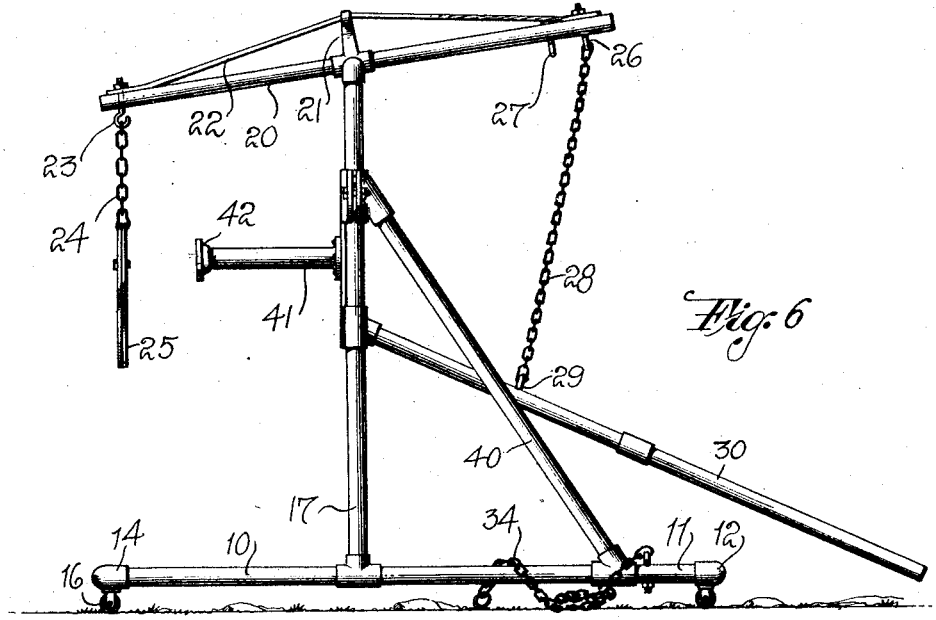
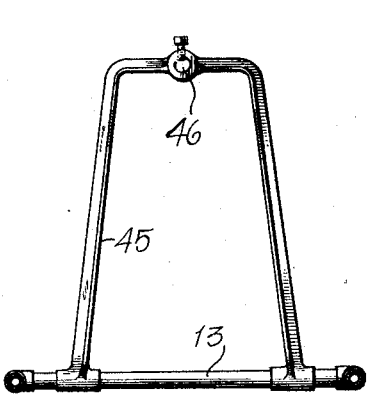
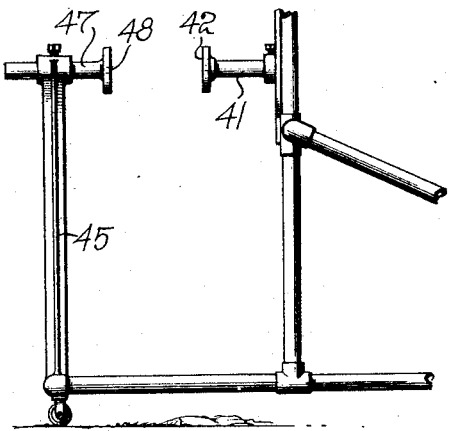
Inventor
Dudley H. Bishard
By Thomas R. Harney
Attorney

UNITED STATES PATENT OFFICE.

DUDLEY H. BISHARD, OF FORT SCOTT, KANSAS.

MOTOR-BLOCK-HANDLING DEVICE.

1,365,220.  Specification of Letters Patent.  Patented Jan. 11, 1921.

Application filed April 1, 1920. Serial No. 370,412.

*To all whom it may concern:*

Be it known that I, DUDLEY H. BISHARD, a citizen of the United States of America, residing at Fort Scott, in the county of Bourbon and State of Kansas, have invented certain new and useful Improvements in Motor-Block-Handling Devices, of which the following is a specification.

My present invention relates generally to motor block handling devices in the nature of a machine for lifting motor blocks after they have been released from their supports, adapted to form a stand for the same while various operations are completed, my object being the provision of a simple compact and convenient apparatus capable of ready, easy handling and which will not utilize excessive floor space.

Figure 1:
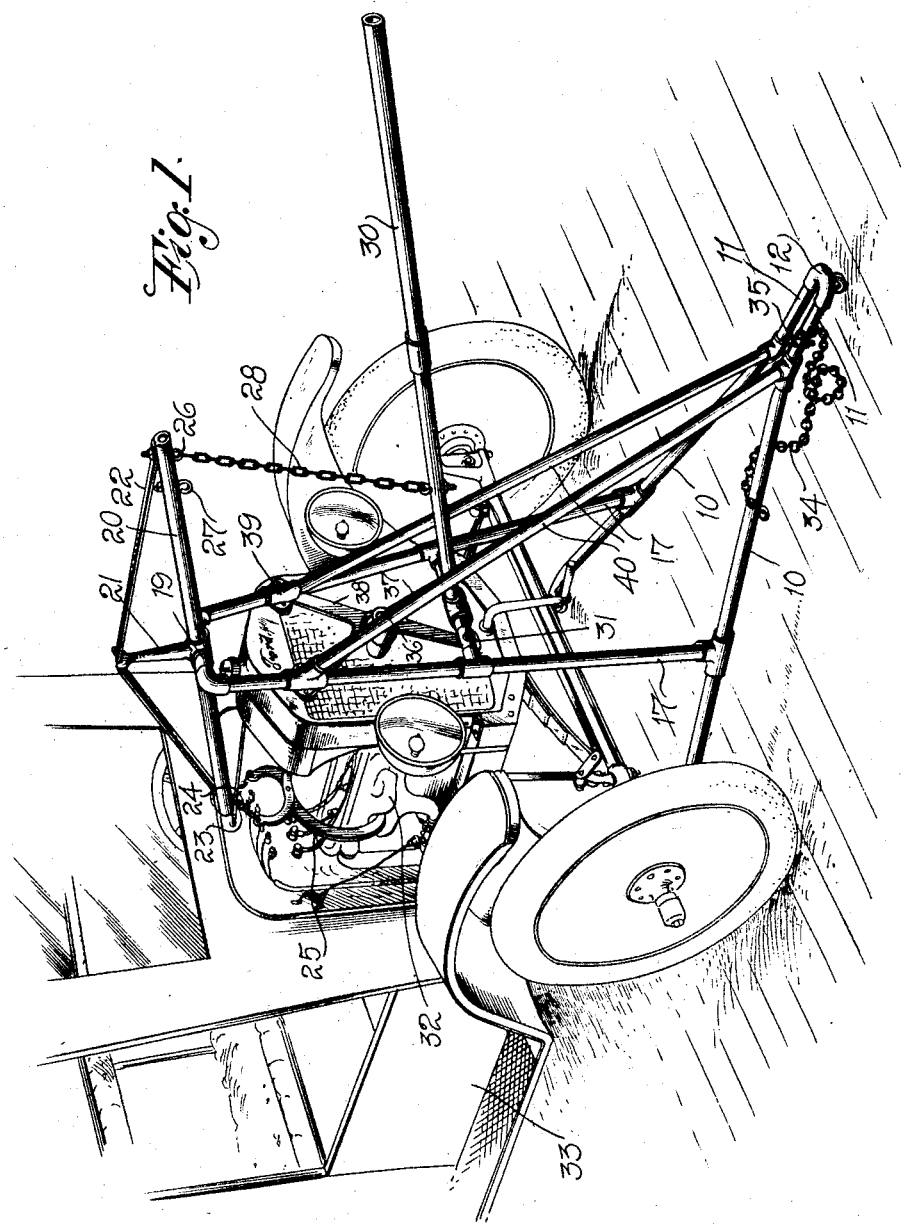
Figure 2:
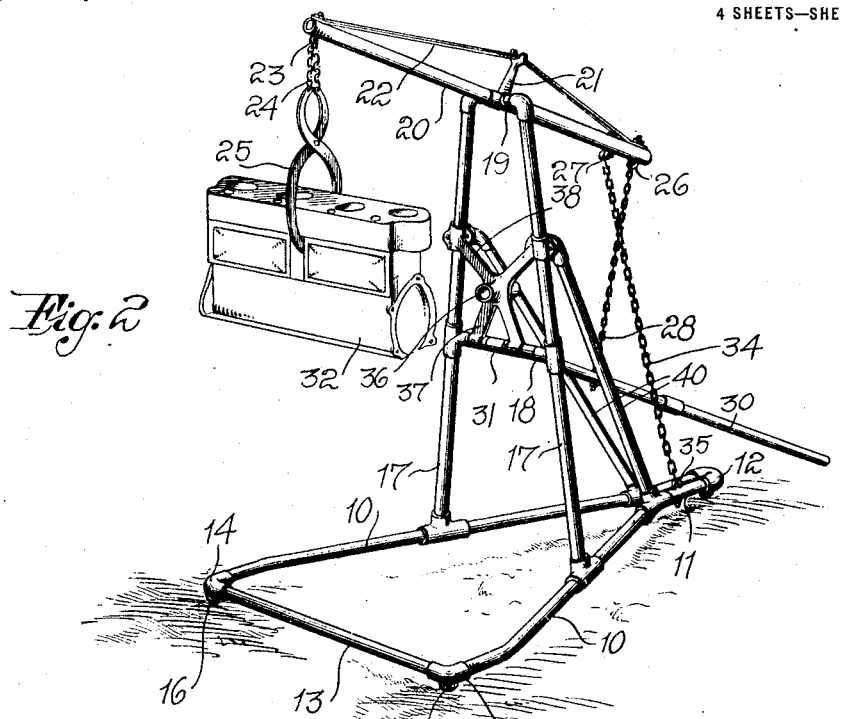
Figure 3:
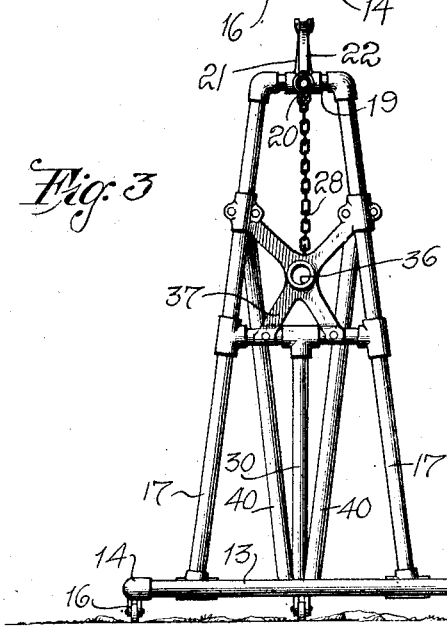

These objects as well as the resulting advantages of my invention will be readily apparent from the following description in which reference is made to the accompanying drawings, forming a part of this specification and wherein, Figure 1 is a perspective view illustrating the practical application of my invention as a means of lifting a motor block free of a motor vehicle, Fig. 2 is a similar view with the motor block free of the machine and held in suspended position, Fig. 3 is a front elevation, Fig. 4 is a perspective view with the motor block bolted in supported relation for operation thereon, Fig. 5 is a top plan view, Fig. 6 is a side elevation, Fig. 7 is a side vew of the lower forward portion illustrating a slight modification, and Fig. 8 is a vertical cross section through Fig. 7.

Referring now to these figures, my invention proposes an apparatus including a lower horizontal frame of generally V-shape, its side bars 10 converging rearwardly to parallel rear extensions 11 connected by a rear U-coupling 12 and having a forward cross bar 13 joining their forward ends by means of angle couplings 14. These latter couplings 14 and the rear U-coupling 12 have depending rollers 16 by which the apparatus as a whole is supported for ready portability.

Rising from the side bars 10 approximately at their centers are a pair of upwardly converging standards 17 connected about at their centers by a lower cross bar 18 and having an upper rigid cross bar 19 between their upper ends forming the fulcrum of a walking beam 20. At its point of fulcrum this walking beam 20 has an upwardly projecting strut 21 for a truss bar 22 connected at its ends to the forward and rear ends of the beam 20.

At its forward end, approximately above the forward cross bar 13, the walking beam 20 has a depending hook 23 for a chain 24 with which a grapple 25 may be associated, and at its rear end the beam has a pair of depending hooks 26 and 27, the former of which is adapted to receive one end of a chain 28, the opposite end of which is engaged with a hook 29 intermediate the ends of an actuating lever 30. This lever has a transverse bearing 31 at one end around the central portion of the lower cross bar 18 and extends rearwardly, with its rear free end forming a handle so that by forcing downwardly upon this handle the rear end of the beam 20 is likewise forced downwardly by virtue of the connecting chain 28.

Thus in view of the unobstructed space between the lower horizontal frame and the forward portion of the walking beam 20, it is obvious the device may be shifted into the position shown in Fig. 1 with respect to an automobile, the rear portion of the lower frame extending beneath the automobile frame and the forward portion of the walking beam 20 extending over the hood of the automobile so that the grapple 25 may be shifted downwardly to engage the motor block, the automobile being generally indicated at 33 in Fig. 1 and its motor block at 32. Engagement of the grapple with the motor block is effected by elevating the operating lever 30, and when the grapple has been engaged it is obvious that downward pressure upon the handle end of the lever serves to elevate the motor block to the position shown in Fig. 2 and to a position above the level of the automobile radiator so that it may be shifted free of the machine by bodily forward movement of the apparatus.

The other hook 27 of the rear portion of the walking beam 20 is adapted to receive a chain 34 one end of which is connected to a hook 35 of one of the rear extensions 11 of the lower horizontal frame, so that the beam may thus be held against movement with the motor block suspended as in Fig. 2, preferably at a point opposite the bearing aperture 36 of a spider frame whose downwardly diverging arms 37 have clamps engaging the lower cross bar 18 and whose upwardly diverging arms 38 have clamps opposing and secured to the upper clamps 39 of a pair of rearwardly and downwardly inclined and converging braces 40, the said clamps engaging the uprights 17 above the cross bar 18, so that the braces 40, secured at their lower rear ends to the rear portions of the side bars 10, will thus operate to effectively brace the upright 17.

The bearing opening 36 of the spider frame is preferably provided with a set screw and is adapted to receive the rear end of a horizontal forwardly projecting bar 41 at whose forward end is a face plate 42 adapted to be bolted to the motor block 32 so that the latter may thereafter be supported for the grinding and adjustment of valves and for various other purposes, with the parts in the position shown in Fig. 4 wherein the tools of the operator are shown supported upon a tray 43 having upright supporting straps 44 whose upper ends are bent to engage the upper cross bar 19 at opposite sides of the center of the beam 20.

I may provide the forward cross bar 13 of the lower frame with a bearing frame 45 of inverted U-shape, having an upper central bearing aperture 46 and having the lower ends of its extension journaled on the cross bar 13 as particularly seen in Figs. 7 and 8 whereby in its upright position its bearing aperture 46 alines with the bearing aperture 36 of the spider frame before described. This bearing aperture 46 may receive a bearing arm 47 as seen in Fig. 7 having a face plate 48 adapted to be bolted to a motor block in opposition to the face plate 42 of the supporting arm 41.

It is thus obvious that the additional bearing frame 45 may be swung downwardly to horizontal position so as not to interfere with the shifting of the forward portion of the lower horizontal frame beneath the forward portion of an automobile frame as in Fig. 1, and need not be elevated to the position of Fig. 7 until after the motor block has been removed and suspended in connection with the supporting arm 41.

It is obvious that the several connecting chains, particularly chains 28 and 34, are adjustable in their length by engaging selected links thereof with the hooks 26 and 27 of the walking beam 20 and it is furthermore obvious that as constructed and from the above description, my invention provides a simple inexpensive apparatus which may be conveniently and effectively utilized for the specified purpose as well as for various other purposes in connection with the elevation and the support in elevated relation of parts to be operated upon, and it is further to be seen that my invention takes up little floor space and is at the same time strong and durable.

I claim:

1. A device of the character described comprising a lower horizontal roller mounted frame, uprights rising from points intermediate the ends of the frame and having braced connection therewith, a walking beam journaled at the upper ends of the uprights and having a depending grapple at one end and a pair of engaging hooks at its opposite end, a lever having a pivotal connection at one end to the uprights, said lever and said frame having flexible connections for adjustable engagement with the hooks of the walking beam as described.

2. A device of the character described comprising a lower horizontal roller mounted frame, uprights rising from points intermediate the ends of the frame and having braced connection therewith, a walking beam journaled at the upper ends of the uprights and having a depending grapple at one end and a pair of engaging hooks at its opposite end, a lever having a pivotal connection at one end to the uprights, and chains adjustably engageable with the hooks of the walking beam, one of said chains being connected to the lever intermediate its ends, and the other chain being connected to the rear portion of the lower horizontal frame.

3. A device of the character described comprising a lower horizontal roller mounted frame, uprights rising from the said frame intermediate its ends and having upper and lower cross bars, a walking beam fulcrumed on the upper cross bar and having engaging means at one end, a lever pivoted on the lower cross bar, connections carried by the lever and the frame for engagement with the other end of the beam, a work supporting bar, and means supported by the uprights for engaging and holding said work supporting bar.

4. A device of the character described comprising a lower horizontal roller mounted frame, uprights rising from the said frame intermediate its ends and having upper and lower cross bars, a walking beam fulcrumed on the upper cross bar and having engaging means at one end, a lever pivoted on the lower cross bar, connections carried by the lever and the frame for engagement with the other end of the beam, a work supporting bar, and means supported by the uprights for engaging and holding said work suporting bar, said last named means being in the nature of a frame having a bearing aperture to receive the bar and having portions engaged with the uprights and with the lower cross bar thereof as described.

5. A device of the character described including a movable frame, uprights rising from the frame, a walking beam fulcrumed at the upper ends of the uprights, a vertically swinging lever, flexible connections carried by the lever and the said frame and detachably and adjustably engageable with one end of the beam, and work engaging means adjustably and detachably engageable with the opposite end of the beam.

6. A device of the character described including a frame, a walking beam fulcrumed in the frame and having work engaging means at one end, a lever pivoted in the frame and having an adjustable connection with the opposite end of the beam, and a detachable work support carried by the frame below the first mentioned end of the beam as described.

In testimony whereof I have affixed my signature.

DUDLEY H. BISHARD.